March 23, 1943. V. GERICH 2,314,582
TWO-WAY DRIFT PIN, SWAGING AND ALIGNING TOOL
Filed Feb. 13, 1941
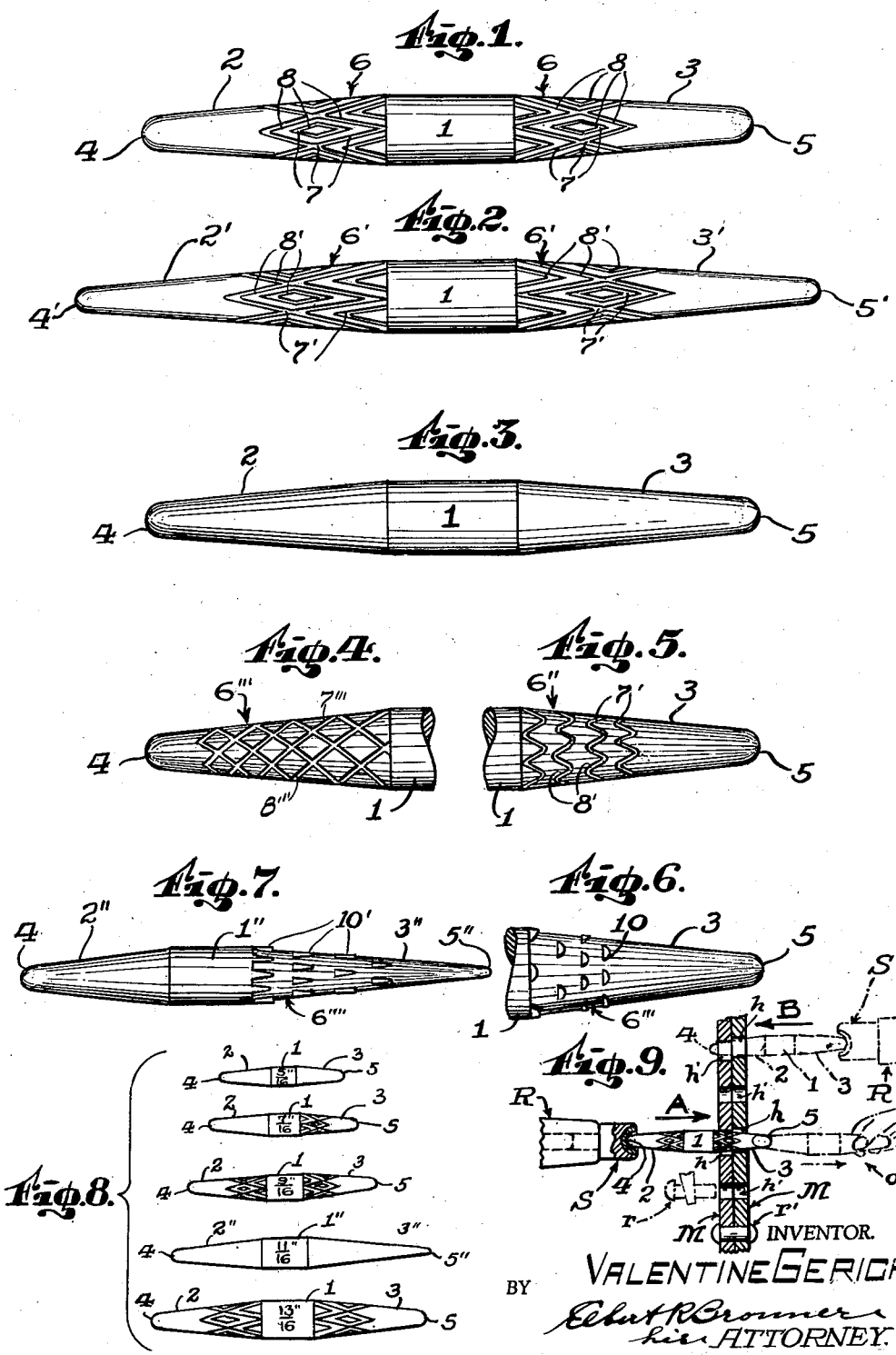
INVENTOR.
VALENTINE GERICH
BY
ATTORNEY.

Patented Mar. 23, 1943

2,314,582

UNITED STATES PATENT OFFICE 2,314,582

TWO-WAY DRIFTPIN, SWAGING AND ALIGNING TOOL

Valentine Gerich, New York, N. Y.

Application February 13, 1941, Serial No. 378,703

7 Claims. (Cl. 29—95.1)

This invention relates to a two-way drift pin, swaging and aligning tool for use by iron and steel workers, particularly where riveting is done, and accelerates the work in a more progressive and convenient manner than the present common drift pin now used, which often gets wedged and has to be hammered sideways to dislodge same from the hole.

The salient feature of this invention, is the straight cylindrical shank portion with extending tapered conical end portions each of which terminate into rounded head-point portions, the tapered end portions may be or may not be provided with any suitable cutting edges or portions, so that the swaging operation into the uneven holes of the plates to be secured together may be expediently done, in which the rivet snap head member drives one of the head-points through the holes while the riveting gun and snap member deliver hammer-like blows on the other head-point, in which the tapered end portion cuts the holes in perfect alignment with each other so the hot rivet may be inserted therethrough to secure the plates members together. As the two-way drift pin is driven clear through the holes, the riveter on the opposite side of the plate member or partition, as on a ship being constructed, redrives the same two-way drift pin through the next holes for their swaging operation, and this passing from one side of the partition to the other side is an important feature that the one-way drift pin does not possess.

Another salient feature of this invention, is that the two-way drift pin may have longer tapered end portions for the same size tool, thus providing for the smaller head-points to enter through a small opening in the uneven holes, and then either of the tapered end portions of the same size tool may finish the swaging. Also one end of the two-way drift pin may be shorter and the other opposite tapered end portion may be longer with a smaller head-point, wherein one tool will be provided with different size head-points, in which the smaller head-point is inserted into the openings of the uneven holes and the other larger head-point is the driving end for snap head member of the air gun riveter.

Another important feature of this invention, is that the two-way drift pin and cutting tool is of highly tempered steel, and may be made in all sizes from the smallest holes, up to holes of 2 inches, more or less, either with or without the cutting edge portions, all placed in a suitable kit, or box, where they may be used for instant operation.

Other important features of this invention will appear as the description proceeds in the following specification, accompanied by the annexed drawing, in which:

Fig. 1 is a side elevational view of the two-way drift pin and cutting tool of this invention, provided with cutting portions on both of the tapered end portions.

Fig. 2 is a similar view of the same size drift pin and cutting tool provided with longer tapered end portions and smaller head-points.

Fig. 3 is a similar view showing the same size tool as shown in Fig. 1 without the cutting portions, this to apply to two-way drift pins in any of the sizes or lengths.

Fig. 4 is a partial similar view showing one form of cutting edges for the tapered end portions.

Fig. 5 is a similar partial view showing another cutting form.

Fig. 6 is a similar partial view showing a further cutting form.

Fig. 7 is a two-way drift pin with different lengths of the tapered end portions with a smaller head-point for swaging and the larger head-point for the driving end.

Fig. 8 is an exploded view of variable sizes of the two-way drift pin and cutting tools, these being but a portion of the many sizes that are necessary for holes of ¼" up to 2", or more.

Fig. 9 illustrates in part section the plate members of a partition being swaged and cut by the two-way drift pin and cutting tool of this invention preparatory to the riveting operation.

Referring to the drawing, Fig. 1 shows a two-way drift pin and cutting tool preferably made of tempered steel, with annealed point ends, in which the numeral 1 indicates the straight and intermediate shank portion of cylindrical shape, which has left and right cutting portions 6 on the tapered end portions 2 and 3, respectively, terminating into rounded annealed head-points 4 and 5, respectively, the cutting portions 6 starting from the intermediate shank portion and extend about one-half way of the length of the tapered end portions 2 and 3, however, this may be more or less. These cutting portions may be of any shape, design or construction, for example, diagonally cut grooves 7 provide diamond shape cutting edges 8, as shown in Fig. 1 and Fig. 2. In Figures 4, 5 and 6, other forms of cutting edges and means are shown, and will be primed with the same numerals of the original forms shown in Figures 1 and 2.

In Fig. 2, the two-way drift pin 1' is provided with longer tapered end portions 2' and 3', whereby the smaller head-points 4' and 5' allow for the insertion of the tool into small openings of the holes of the members to be swaged and aligned with each other by the cutting edges 7'.

In Fig. 3, the two-way drift pin is the same as shown in Fig. 1, but the cutting portions 6 are omitted, in which case the tool becomes a two-way drift pin, and not a cutting tool, but the physical characteristics and structure of form and use, is the same in both tools.

In Figures 4, 5 and 6, variable cutting portions are shown, as for example, by a left and right hand twist grooved cutting edges 8'', shown in Fig. 4, or by corrugated cutting portions 6'', shown in Fig. 5, and by raised cutting edges 10, shown in Fig. 6.

In Fig. 7, the two-way drift pin is shown with one of the tapered end portion longer than the other, thereby providing a double drift pin 1''', or two tools in one, both of the tapered end portions 2'' and 3'', or only one, may or may not be provided with a cutting portion 6'', as is shown in the exploded view of Fig. 8, in which a full set of all sizes and types of the two-way drift pin and cutting tool may be arranged in a kit or box, not shown, as may be desired. In the exploded view of Fig. 8, only a few types and sizes are shown for illustrative purposes on a greatly reduced scale. Sizes vary from $\frac{3}{16}$'' to 2'' or more, depending upon the rivets and drill of holes.

In Fig. 9, this invention is illustrated in operation, showing the combination use of separate plate members M, which may be part of a partition in ship construction, having holes $h$ that are not in alignment with each other. The two-way drift pin and cutting tool is shown having the round head-point 5 inserted in the opening therewith, and the snap head member S of an air gun riveter R driving the other free end 4 with hammer-like blows in order to force the cutting portion 6 of the tapered end portion 3 into the opening, thereby swaging and cutting the holes in their original sizes through which is driven the cylindrical shank portion 1, after which the tool may be easily removed by the worker on the other side of the partition, whom in turn repeats the same operation in the next adjacent holes that require alignment, in which the tool is again in the hands of the first worker, and this continues for the necessary work required. This cooperation of workers with the two-way drift pin and cutting tool, and the snap head member of the air gun riveter provides the combination of step operations that provide acceleration in the work to be done, and also provide the convenience of progressive movements not available in present one way drift pins that have to be retracted out of their swaged position by hammering or prying, thus delaying the work by a crude method of wasted time. After the two-way drift pin and cutting tool has been driven in the direction of the arrows A and B, these previous uneven holes $h$ are aligned as at $h'$, through which is inserted a hot rivet $r$ and riveted over at $r'$ by the snap head member of the air gun riveter R.

It is to be understood that the grooves 7 and projections 10 may be reversed to projections and grooves, respectively, or any other suitable means may be adopted instead for the tapered end portions 2 and 3 and those that are primed, for this cutting operation, tests must be made to adopt the most suitable means.

It is to be further understood, that I do not confine myself to the exactness of parts shown in the drawing and described hereinbefore, but reserve the right to alter and improve same, providing same comes within the scope of the appended claims.

I claim:

1. In a two-way drift pin and cutting tool of the character described, comprising a tool provided with an intermediate shank portion terminating at both ends into tempered tapering portions having annealed round head-points, said tapered ends having means for cutting, said round head-points adapted to receive hammer-like blows by a snap head member of an air gun riveter, and said tool adapted to be driven into holes of sheet metal members that are to be riveted together, whereby said holes are cut in perfect alignment for the insertion of the rivet therein, and said tool adapted to be driven and swaged by said intermediate shank portion clear through said holes and redriven back through another set of holes adjacent thereto.

2. In a two-way drift pin and cutting tool of the character described, comprising a tool provided with tapered ends terminating into round head-points with a straight intermediate shank portion, said tapered ends provided with cutting means, one of said tapered ends being longer than the other, said round head-points being of different sizes, said round head-points adapted to be engaged and driven through cut holes of two sheet metal members for aligning same and swaging same for the riveting operation therethrough, said tool adapted to be driven clear through said swaged holes whereby the tool may be redriven back through other holes adjacent thereto for the same repeated operation.

3. In a drift pin of the character described, comprising a tool provided with tapered end portions having an intermediate round shank portion, one of said tapered end portions provided with cutting means, the other tapered end portions adapted to engage and be driven by a snap head member of an air gun riveter, whereby said cutting means engages cut or drilled holes of metal plates, thereby cutting them to their true alignment, the intermediate shank portion swaging the holes, said tool also adapted to be driven clear through said aligned and swaged holes, whereat said tool may be redriven back through other holes adjacent thereto, for a similar cutting and swaging operation.

4. In a two-way drift pin of the character described, comprising a tool provided with tapered end portions having round head-points, said tapered end portions having an intermediate cylindrical shank portion, said round head-points adapted to be driven by a snap head member of an air gun riveter, whereby said tapered end portions and shank portion are driven entirely through uneven holes in metal plates for swaging and aligning said holes with each other, and said tool adapted further to be redriven through other uneven holes adjacent thereto for a similar operation.

5. In two-way drift pins, swaging and aligning tool members of the character described, said tool members being made in specified sizes for required holes to be swaged, and aligned, said members comprising a cylindrical shank portion having tapering end portions terminating into round head-points, said members tempered except the round head-points which is annealed, said tool members adapted to be driven into uneven holes of sheet members for the swaging and aligning of said holes, said tool members being driven by an air gun riveter having a snap head member that fits onto the round head-points of said tool members, said shank portion providing aligning means of said holes, said tool members adapted to be driven clear through said holes, and to be redriven back through adjacent uneven holes for a similar operation.

6. In a two-way drift pin, swaging and aligning tool member of the character described, comprising a cylindrical shank portion having tapering end portions terminating into round head-points, said tool member being made in specified sizes for required holes, one of said tapering end portions provided with a smaller round head-point than the other end portion, whereby said smaller round head point provides less tapering portion and allows same to be inserted into small openings of uneven holes, said larger head-point adaptable to be driven by the snap head member of an air gun riveter, whereby said shank portion aligns said holes after said tapering portion swages same, said tool member being driven clear through said holes and adapted to be redriven back, air gun riveters being on opposite sides of plate members, the holes of which are being swaged and aligned for their riveting operation.

7. In a drift pin and aligning tool member of the character described, a cylindrical shank portion having at either end a tapering end portion provided with a round head-point, said tool member being tempered, except the round head-point which is annealed, said round head-point adapted to be driven by the snap head member of an air gun riveter, said tool member adapted to be driven clear through uneven holes of plate members that are to be riveted together, whereby said cylindrical shank portion aligns all the holes of said plate members, said tool member being made in specified sizes for the required size of holes.

VALENTINE GERICH.